(12) United States Patent
Zhang et al.

(10) Patent No.: US 12,533,190 B2
(45) Date of Patent: Jan. 27, 2026

(54) METHOD AND SYSTEM FOR AUXILIARY PLANNING FRACTURE REDUCTION PATH BASED ON AUGMENTED REALITY TECHNOLOGY

(71) Applicant: The Fourth Medical Center of the Chinese People's Liberation Army General Hospital, Beijing (CN)

(72) Inventors: Licheng Zhang, Beijing (CN); Peifu Tang, Beijing (CN); Xiang Cui, Beijing (CN); Chi Ma, Beijing (CN); Houchen Lv, Beijing (CN); Jia Li, Beijing (CN); Pengbin Yin, Beijing (CN)

(73) Assignee: The Fourth Medical Center of the Chinese People's Liberation Army General Hospital, Beijing (CN)

( * ) Notice: Subject to any disclaimer, the term of this patent is extended or adjusted under 35 U.S.C. 154(b) by 0 days.

(21) Appl. No.: 18/964,232

(22) Filed: Nov. 29, 2024

(65) Prior Publication Data

US 2025/0090232 A1    Mar. 20, 2025

(30) Foreign Application Priority Data

Aug. 23, 2024    (CN) .......................... 202411168433.8

(51) Int. Cl.
*G06T 15/04*    (2011.01)
*A61B 6/50*    (2024.01)
(Continued)

(52) U.S. Cl.
CPC .............. *A61B 34/10* (2016.02); *A61B 6/505* (2013.01); *G06T 15/04* (2013.01); *A61B 2034/105* (2016.02); *A61B 2034/107* (2016.02); *A61B 2090/367* (2016.02); *G06T 2210/41* (2013.01); *G06T 2215/16* (2013.01)

(58) Field of Classification Search
None
See application file for complete search history.

(56) References Cited

U.S. PATENT DOCUMENTS

2018/0344308 A1    12/2018    Nawana et al.
2019/0216452 A1    7/2019    Nawana et al.
(Continued)

*Primary Examiner* — Robert J Craddock

(57) ABSTRACT

A method for auxiliarily planning a fracture reduction path based on an augmented reality technology includes: obtaining fracture image data for a fracture area of a patient, the fracture image data including computer tomography (CT) data and X-ray data; reconstructing a three-dimensional model of a fracture part based on the fracture image data; matching and calibrating the three-dimensional model of the fracture part based on the fracture area of the patient in an actual scene; inputting a calibrated three-dimensional model of the fracture part and a corresponding fracture type and fracture surgery requirement into a fracture reduction path planning model to determine at least one corresponding optimized fracture reduction path, where the fracture reduction path planning model includes a cascaded reinforcement learning (RL) module and a multi-physics field simulation optimization module; and rendering each fracture reduction path, and determining a target fracture reduction path according to a detected interactive instruction.

8 Claims, 7 Drawing Sheets

(51) Int. Cl.
    *A61B 34/10*     (2016.01)
    *A61B 90/00*     (2016.01)

(56)     References Cited

U.S. PATENT DOCUMENTS

| | | | |
|---|---|---|---|
| 2022/0061919 A1* | 3/2022 | Destainville | A61B 34/10 |
| 2024/0206990 A1* | 6/2024 | Boddington | G06V 10/426 |
| 2024/0299134 A1 | 9/2024 | Wen | |

* cited by examiner

METHOD AND SYSTEM FOR AUXILIARY PLANNING FRACTURE REDUCTION PATH BASED ON AUGMENTED REALITY TECHNOLOGY

CROSS-REFERENCE TO RELATED APPLICATIONS

This application claims priority to Chinese Patent Application No. 202411168433.8 with a filing date of Aug. 23, 2024. The content of the aforementioned application, including any intervening amendments thereto, is incorporated herein by reference.

TECHNICAL FIELD

The present disclosure relates to the technical field of smart medical systems, and in particular, to a method and system for auxiliarily planning a fracture reduction path based on an augmented reality technology.

BACKGROUND

With the development of medical imaging technologies, fracture reduction surgery has gradually developed towards minimally invasive and precise directions. Traditional fracture reduction surgery mainly relies on a doctor's experience and visual feedback. Especially for complex fractures, doctors need to complete the reduction through repeated attempts and adjustments, which not only prolongs operation time and increases a surgical risk, but also makes it difficult to ensure accuracy of the fracture reduction. This can easily lead to poor alignment of a fracture site, thus affecting fracture healing and functional recovery.

In addition, in a current imaging-assisted fracture reduction technology, doctors mainly operate through two-dimensional images (such as X-rays) or direct vision with a naked eye. Doctors cannot intuitively feel a three-dimensional spatial structure of the fracture site, especially when the field of vision is limited or the fracture type is complex. It is difficult to accurately judge a relative position of a bone fragment and an optimal reduction direction, which also relatively increases the difficulty and risk of the operation.

In response to the above problems, the industry has not yet proposed a better technical solution.

SUMMARY

The embodiments of the present disclosure provide a method and system for auxiliarily planning a fracture reduction path based on an augmented reality technology, which are used to at least solve a problem that a current related technology cannot provide a better fracture reduction reference by relying on a two-dimensional fracture reduction image-assisted technology.

According to a first aspect, an embodiment of the present disclosure provides a method for auxiliarily planning a fracture reduction path based on an augmented reality technology, which is applied to AR glasses. The method includes: obtaining fracture image data for a fracture area of a patient, where the fracture image data includes computer tomography (CT) data and X-ray data; reconstructing a three-dimensional model of a fracture part based on the fracture image data, where the three-dimensional model of the fracture part includes a plurality of bone block modules, and each of the bone block modules is marked with a corresponding position, boundary, and color; matching and calibrating a reconstructed three-dimensional model of the fracture part based on the fracture area of the patient in an actual surgical scene; inputting a matched and calibrated three-dimensional model of the fracture part and a corresponding fracture type and fracture surgical requirement into a fracture reduction path planning model to determine at least one corresponding optimized fracture reduction path; and rendering each of the at least one optimized fracture reduction path, and determining a target fracture reduction path according to a detected interactive instruction. The fracture reduction path planning model includes a cascaded reinforcement learning (RL) module and a multi-physics field simulation optimization module.

The RL module is configured to determine at least one initial reduction path based on the fracture type, the matched and calibrated three-dimensional model of the fracture part, and the fracture surgery requirement, where a state of the RL module is defined based on a geometric feature of the matched and calibrated three-dimensional model of the fracture part, spatial relative orientation information of a bone block, and the fracture type, an action space of the RL module is defined based on movement, rotation, and force of the bone block, a reward function of the RL module is defined based on the fracture surgery requirement, and the fracture surgery requirement includes a reduction accuracy requirement, a path smoothness requirement, and a physiological constraint requirement; and input each of the at least one initial reduction path into the multi-physics field simulation optimization module to perform stress distribution simulation on each of the at least one initial reduction path through finite element analysis, and optimize and adjust a corresponding initial path based on a simulation result to determine the at least one corresponding optimized fracture reduction path.

The reward function R of the RL module is expressed as follows:

$$R = r_{accuracy} + r_{smoothness} + r_{physiology}$$

$$r_{accuracy} = -\alpha \cdot \|M_{target} - M_{current}\|$$

$$r_{smoothness} = -\beta \cdot \sum_{i=1}^{N-1} \|\kappa_i\|$$

$$r_{physiology} = -\gamma \cdot \sum_{i=1}^{N} \max(0, \sigma_i - \sigma_{limit})$$

where $r_{accuracy}$ represents a reduction accuracy reward item, which is used to reflect a position error of the bone block after reduction; $r_{smoothness}$ represents a path smoothness reward item, which is used to reflect smoothness of a path; $r_{physiology}$ represents a physiological constraint reward item, which is used to ensure that the path meets physiological and mechanical requirement to avoid damaging a surrounding tissue; $M_{target}$ represents target position coordinates, which indicates a position at which the bone block reaches after the reduction; $M_{current}$ represent current position coordinates of the bone block, which indicates a position of the bone block at a current moment; $\alpha$ represents an accuracy adjustment parameter, which is used to adjust an impact of reduction accuracy on a total reward; $\kappa_i$ represents a path curvature, which indicates a curvature value of an $i^{th}$ path node on the path; N represents a total quantity of path nodes; $\beta$ represents a smoothness adjustment parameter, which is used to adjust an impact of path smoothness on the total reward; $\sigma_i$ represents a stress value of the $i^{th}$ path node on the path;

$\sigma_{limit}$ represents a physiological stress limit, where damage is caused to a tissue when stress on the path exceeds the limit; and $\gamma$ represents a physiological constraint adjustment parameter, which is used to adjust an impact of a physiological constraint on the total reward.

According to a second aspect, an embodiment of the present disclosure provides a system for auxiliarily planning a fracture reduction path based on an augmented reality technology. The system includes: a data acquisition unit configured to obtain fracture image data for a fracture area of a patient, where the fracture image data includes CT data and X-ray data; a model reconstruction unit configured to reconstruct a three-dimensional model of a fracture part based on the fracture image data, where the three-dimensional model of the fracture part includes a plurality of bone block modules, and each of the bone block modules is marked with a corresponding position, boundary, and color; a model calibration unit configured to match and calibrate a reconstructed three-dimensional model of the fracture part based on the fracture area of the patient in an actual surgical scene; a path planning unit configured to input the matched and calibrated three-dimensional model of the fracture part and a corresponding fracture type and fracture surgical requirement into a fracture reduction path planning model to determine at least one corresponding optimized fracture reduction path; and a path confirmation unit configured to render each of the at least one optimized fracture reduction path, and determine a target fracture reduction path according to a detected interactive instruction, where the fracture reduction path planning model includes a cascaded RL module and a multi-physics field simulation optimization module.

The RL module is configured to determine at least one initial reduction path based on the fracture type, the matched and calibrated three-dimensional model of the fracture part, and the fracture surgery requirement, where a state of the RL module is defined based on a geometric feature of the matched and calibrated three-dimensional model of the fracture part, spatial relative orientation information of a bone block, and the fracture type, an action space of the RL module is defined based on movement, rotation, and force of the bone block, a reward function of the RL module is defined based on the fracture surgery requirement, and the fracture surgery requirement includes a reduction accuracy requirement, a path smoothness requirement, and a physiological constraint requirement; and input each of the at least one initial reduction path into the multi-physics field simulation optimization module to perform stress distribution simulation on each of the at least one initial reduction path through finite element analysis, and optimize and adjust a corresponding initial path based on a simulation result to determine the at least one corresponding optimized fracture reduction path.

The reward function R of the RL module is expressed as follows:

$$R = r_{accuracy} + r_{smoothness} + r_{physiology}$$

$$r_{accuracy} = -\alpha \cdot \|M_{target} - M_{current}\|$$

$$r_{smoothness} = -\beta \cdot \sum_{i=1}^{N-1} \|\kappa_i\|$$

$$r_{physiology} = -\gamma \cdot \sum_{i=1}^{N} \max(0, \sigma_i - \sigma_{limit})$$

where $r_{accuracy}$ represents a reduction accuracy reward item, which is used to reflect a position error of the bone block after reduction; $r_{smoothness}$ represents a path smoothness reward item, which is used to reflect smoothness of a path; $r_{physiology}$ represents a physiological constraint reward item, which is used to ensure that the path meets the physiological and mechanical requirements to avoid damaging a surrounding tissue; $M_{target}$ represents target position coordinates, which indicates a position at which the bone block reaches after the reduction; $M_{current}$ represents current position coordinates of the bone block, which indicates a position of the bone block at a current moment; $\alpha$ represents an accuracy adjustment parameter, which is used to adjust an impact of reduction accuracy on a total reward; $\kappa_i$ represents a path curvature, which indicates a curvature value of an $i^{th}$ path node on the path; N represents a total quantity of path nodes; $\beta$ represents a smoothness adjustment parameter, which is used to adjust an impact of path smoothness on the total reward; $\sigma_i$ represents a stress value of the $i^{th}$ path node on the path; $\sigma_{limit}$ represents a physiological stress limit, where damage is caused to a tissue when stress on the path exceeds the limit; $\gamma$ represents a physiological constraint adjustment parameter, which is used to adjust an impact of a physiological constraint on the total reward.

According to a third aspect, an embodiment of the present disclosure provides an electronic device, including: at least one processor, and a memory communicatively connected to the at least one processor, where the memory stores an instruction executable by the at least one processor, and the instruction is executed by the at least one processor to perform the steps of the above method.

According to a fourth aspect, an embodiment of the present disclosure provides a storage medium, where the storage medium stores at least one program including an execution instruction. The execution instruction can be read and executed by an electronic device (including but not limited to a computer, a server, a network device, or the like) to execute the steps of the above method in the present disclosure.

According to a fifth aspect, an embodiment of the present disclosure further provides a computer program product, where the computer program product includes a computer program stored on a storage medium. The computer program includes a program instruction, and the program instruction is executed by a computer to execute the steps of the above method.

The method and system for auxiliarily planning a fracture reduction path based on an augmented reality technology, the electronic device, and the non-transitory computer-readable storage medium provided in the present disclosure can produce at least the following technical effects:

(1) The method for auxiliarily planning a fracture reduction path based on an augmented reality technology can provide an intuitive three-dimensional view by obtaining the fracture image data of the patient and reconstructing the three-dimensional model, which can significantly improve accuracy of the reduction and reduce blind adjustments during the reduction. By combining the RL module and the multi-physics field simulation optimization module, the system can generate a reduction path with excellent simulation performance based on the fracture type and the surgical requirement to further improve the accuracy of the reduction, ensure precise alignment of the bone block, and promote fracture healing and functional recovery.

(2) The RL algorithm is used to perform preliminary path planning for the fracture area, and input a preliminary path into a multi-physics field simulation model for mechanical simulation and optimization. With adaptability and flexibility, the RL algorithm can optimize the path in real time, but it may lack mechanical feasibility and safety in an actual operation. The multi-physics field simulation model can effectively combine mechanical simulation and actual operating conditions to provide a more accurate and safer path, but requires a high computational cost and a complex simulation model. In the technical solutions, the fracture reduction path planning model effectively integrates advantages of the RL algorithm and the multi-physics field simulation model, and achieves adaptative path planning and accurate and safe mechanical simulation and optimization. The fracture reduction path planning model can not only provide the preliminary path planning, but also further optimize the path through the mechanical simulation to ensure feasibility and safety of the actual operation, and has higher practical value.

(3) In the technical solutions, the finite element analysis is performed through the multi-physics field simulation optimization module to simulate the stress distribution on the reduction path, so as to ensure that the path meets the physiological and mechanical requirements and avoid damaging the surrounding tissue. This is especially suitable for a situation where the field of vision is limited or the fracture site is complex. In this way, a relative position and a reduction direction of the bone block can be accurately determined, reducing an uncertainty and a potential risk in the reduction process and improving the safety of the operation.

(4) In the technical solutions, the reward function of the RL module takes into account the reduction accuracy, the path smoothness, and the physiological constraint, and can be adaptively adjusted based on an actual surgical situation. Through flexible setting of the accuracy adjustment parameter, the smoothness adjustment parameter, and the physiological constraint adjustment parameter, the system can dynamically adjust the reduction path to adapt to different types of fractures and surgical requirements. The reward function has strong adaptability and flexibility to meet needs of different surgical scenarios.

(5) Traditional fracture reduction surgery relies on a doctor's experience and tactile feedback, often requiring repeated attempts and adjustments, which is time-consuming. By using an augmented reality technology and an automated path planning model, the solutions can quickly generate and display the fracture reduction path, thereby reducing the doctor's operating time and trial and error process, greatly improving surgical efficiency, significantly shortening operation time, reducing the doctor's workload, and reducing a surgical risk of the patient.

According to the technical solutions, the reconstructed 3D model and the reduction path are superimposed in the actual surgical scene through the AR glasses, and the doctor can view a matching status of the reduction path and the fracture area of the patient in real time, providing intuitive and real-time guidance. The augmented reality technology is applied in a fracture reduction scene, which improves the doctor's operating experience, makes a surgical process more controllable and intuitive, and helps to improve a success rate of the operation and a rehabilitation effect of the patient.

BRIEF DESCRIPTION OF THE DRAWINGS

In order to more clearly illustrate the technical solutions in the embodiments of the present disclosure, the drawings required for describing the embodiments will be briefly introduced below. Obviously, the drawings described below are only some embodiments of the present disclosure. Those of ordinary skill in the art can still derive other drawings based on these drawings without creative efforts.

DESCRIPTION OF THE EMBODIMENTS

In order to make the objectives, technical solutions, and advantages of the embodiments of the present disclosure clearer, the technical solutions of the embodiments of the present disclosure will be clearly and completely described below in conjunction with the drawings of the embodiments of the present disclosure. Apparently, the described embodiments are some rather than all of the embodiments of the present disclosure. All other embodiments obtained by those skilled in the art based on the embodiments of the present disclosure without creative efforts shall fall within the protection scope of the present disclosure.

Unless otherwise defined, the technical terms or scientific terms used in the present disclosure should be understood in a generic sense by people with ordinary skills in the field to which the present disclosure belongs. "First", "second", and similar words used in the present disclosure do not indicate any order, quantity or importance, but are only used to distinguish different components. Similarly, similar words such as "one", "a/an" or "the" do not indicate a quantitative restriction, but indicate existence of at least one. "Including" or "comprising" and other similar words mean that an element or object appearing before the word covers an element or object listed after the word and their equivalents, without excluding other elements or objects. "Connection" or "interconnection" and other similar words are not limited to a physical or mechanical connection, but may include direct and indirect electrical connections.

It should be noted that the terms "up", "down", "left", "right", "front", "back", and the like used in the present disclosure are only used to indicate relative position relationships. When an absolute position of an object being described changes, a relative position relationship may also change accordingly.

Figure 1:
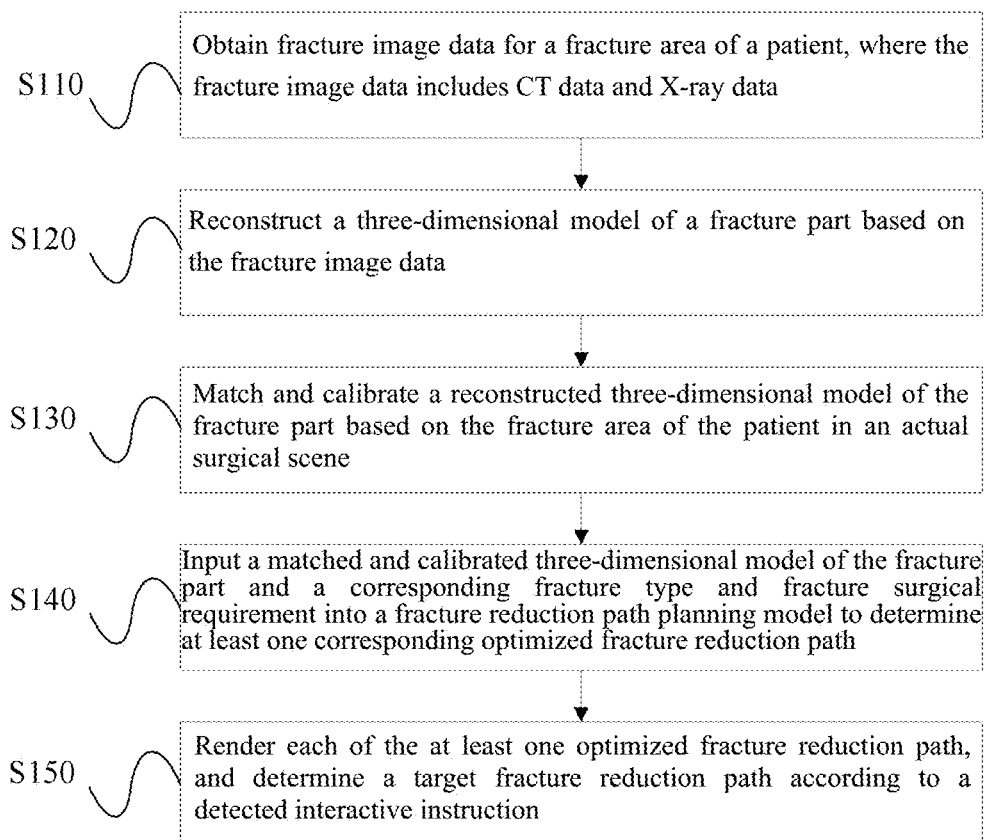
FIG. 1 is a flowchart of an example of a method for auxiliarily planning a fracture reduction path based on an augmented reality technology according to an embodiment of the present disclosure.

FIG. 1 is a flowchart of an example of a method for auxiliarily planning a fracture reduction path based on an augmented reality technology according to an embodiment of the present disclosure.

An execution subject of the method in the embodiments of the present disclosure may be any controller or processor with computing or processing capabilities, which utilizes an augmented reality technology, RL, and multi-physics field simulation optimization to significantly improve accuracy and efficiency of fracture reduction surgery, reduce a difficulty and risk of surgery, improve a postoperative recovery effect, and promote standardization and repeatability of a surgical operation.

In some examples, the controller or processor may be integrated into a configuration server through software, hardware, or a combination of software and hardware, which should not be limited herein.

The following will take a fracture reduction planning platform as an exemplary implementation subject to describe details of the technical solutions involved in the present disclosure. However, it should be understood that at least one step involved in the following process can be implemented by at least one controller or software that is installed and deployed in a client or server.

As shown in FIG. 1, in step S110, fracture image data for a fracture area of a patient is obtained, and the fracture image data includes CT data and X-ray data.

In some embodiments, the CT data and the X-ray data of the fracture area of the patient are collected to ensure high resolution and integrity of the image data. In addition, the collected image data can be preprocessed, including denoising, standardization, and calibration, to improve data quality and accuracy. Then, processed image data is input into a system to generate a complete fracture area image dataset. Thus, accuracy and reliability of basic data for subsequent three-dimensional model reconstruction and path planning are ensured, and accuracy of entire fracture reduction path planning is improved.

More specifically, image data of the fracture area of the patient is obtained from CT and X-ray scanners, and the image data should include a plurality of slices, covering all levels of the fracture area. In addition, the CT data and the X-ray data are usually stored in a DICOM format, and need to be standardized for subsequent processing.

In step S120, a three-dimensional model of a fracture part is reconstructed based on the fracture part image data. The three-dimensional model of the fracture part includes a plurality of bone block modules, and each bone block module is marked with a corresponding position, boundary, and color.

In some embodiments, an image segmentation algorithm is used to obtain bone blocks in the fracture image data through segmentation. Then, based on a segmentation result, a three-dimensional reconstruction algorithm (such as a surface reconstruction algorithm or a volume reconstruction algorithm) is used to generate a three-dimensional model of a fracture site. Then, the corresponding position, boundary, and color are marked for each bone block module, which can be more conducive to personalized display of different bone block modules and facilitate subsequent matching and path planning. Thus, through precise image segmentation and three-dimensional reconstruction, a detailed three-dimensional model of the fracture site is generated, such that a doctor can clearly understand a structure of the fracture area and provide accurate spatial information for path planning.

Figure 2:
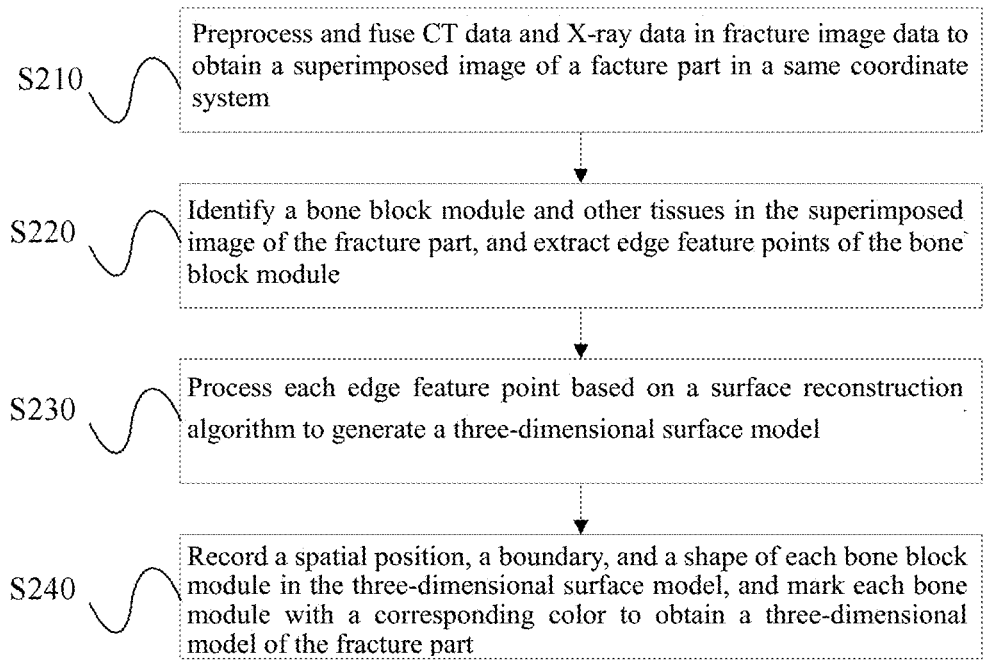
FIG. 2 is an operation flowchart of an example of reconstructing a three-dimensional model of a fracture part based on fracture part image data according to an embodiment of the present disclosure.

FIG. 2 is an operation flowchart of an example of reconstructing the three-dimensional model of the fracture part based on the fracture image data according to an embodiment of the present disclosure. As shown in FIG. 2, in step S210, the CT data and the X-ray data in the fracture image data are processed and fused to obtain a superimposed image of the fracture part in a same coordinate system. More specifically, a filter (such as a Gaussian filter) can be used to denoise the CT and X-ray image data to remove noise and artifacts in the image and enhance clarity of a bone structure. In addition, an image enhancement technique (such as histogram equalization) is used to improve a contrast of the image data and highlight a difference between a bone and a soft tissue. Afterwards, slices of the CT and X-ray image data are matched to ensure that images at different levels are accurately superimposed in the same coordinate system. In step S220, the bone block module and other tissues in the superimposed image of the fracture part are identified, and edge feature points of the bone block module are extracted. In one example, the image data can be segmented using a pre-trained deep learning model to automatically identify and extract the bone structure. In another example, based on a gray value difference between the bone and the soft tissue, an appropriate threshold is set for the segmentation to extract a bone area, thereby segmenting the bone structure in the image data from other tissues. Then, an edge detection algorithm (e.g., Canny edge detection) is used to extract an edge of the bone block, generate an outline of the bone block, and extract the outline and a boundary of the bone block from the segmentation result. In step S230, each edge feature point is processed based on the surface reconstruction algorithm to generate a three-dimensional surface model. Herein, the surface reconstruction algorithm can adopt a general algorithm or another enhanced innovative algorithm such as a marching cubes algorithm to connect bone edge points in the slice to generate the three-dimensional surface model. In step S240, the spatial position, boundary, and shape of each bone block module in the three-dimensional surface model are recorded, and each bone block module is marked with the corresponding color to obtain the three-dimensional model of the fracture part. In this way, based on the segmentation result and edge detection, the bone block is divided into a plurality of modules, and each module is marked to achieve modular processing of the bone block in the three-dimensional model.

Thus, through the data obtaining and preprocessing, the image segmentation, the bone structure extraction, the three-dimensional reconstruction, and the bone block modularization, the three-dimensional model of the fracture part can be reconstructed based on the image data of the fracture part. Through data obtaining and preprocessing technologies, the CT and X-ray image data can be quickly processed, noise can be removed, and image quality can be enhanced. In this way, after the doctor obtains the image data, the system can quickly generate a processed image, saving data processing time and speeding up a surgical preparation process. Through image segmentation and bone structure extraction technologies, the bone can be accurately separated from other tissues to ensure that the bone block in the three-dimensional model is consistent with an actual fracture area. In this way, in the fracture reduction surgery, the doctor can formulate a more accurate surgical plan based on the accurate three-dimensional model, thereby reducing a surgical error, and improving accuracy of reduction.

In some examples of the embodiments of the present disclosure, the surface reconstruction algorithm is enhanced and optimized in a process of practicing the present disclosure, and an adaptive Marching Cubes algorithm based on deep learning is proposed. A deep learning model is introduced to predict a geometric property and an isosurface position of a local mesh, so as to adaptively adjust meshing to further improve reconstruction accuracy and efficiency.

Figure 3:
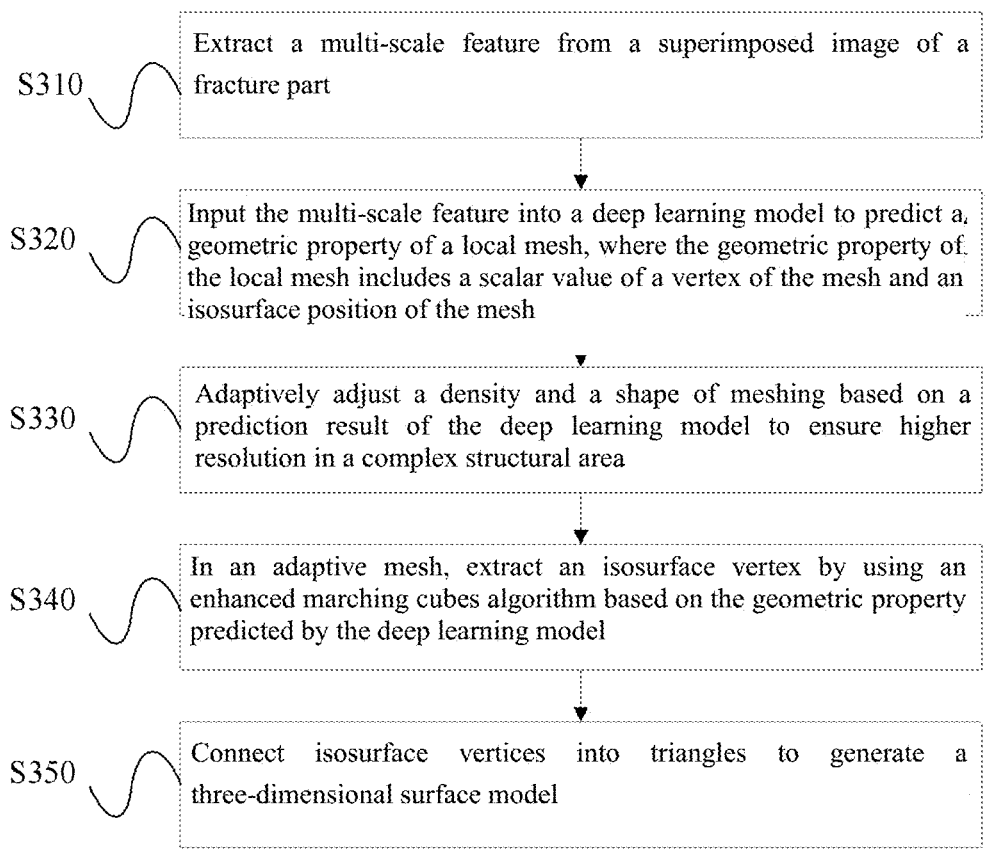
FIG. 3 is an operation flowchart of an example of generating a three-dimensional surface model based on an enhanced surface reconstruction algorithm according to an embodiment of the present disclosure.

FIG. 3 is an operational flowchart of an example of generating the three-dimensional surface model based on an enhanced surface reconstruction algorithm according to an embodiment of the present disclosure.

As shown in FIG. 3, in step S310, a multi-scale feature is extracted from the superimposed image of the fracture part. In step S320, the multi-scale feature is input into the deep learning model to predict the geometric property of the local mesh. The geometric property of the local mesh includes a scalar value of a vertex of the mesh and the isosurface position of the mesh. In step S330, a density and a shape of meshing are adaptively adjusted based on a prediction result of the deep learning model to ensure higher resolution in a complex structural area:

$$V_{adaptive} = \sum_{i=1}^{n} f(p_i) \cdot 2^{i-1} \quad (1)$$

In the above formula, $V_{adaptive}$ represents a vertex index value in an adaptive mesh; a local geometric property predicted by the deep learning model is represented by $P=\{p_1, p_2, \ldots, p_n\}$, where $p_i$ represents a geometric property of a local area i; $f(p_i)$ represents a scalar value function that is of the vertex and predicted based on the local geometric property $p_i$. In step S340, in the adaptive mesh, an enhanced marching cubes algorithm is applied to extract an isosurface vertex based on the geometric property predicted by the deep learning model.

Specifically, an intersection point of an isosurface on an edge of a cube is determined through interpolation, and used as the isosurface vertex:

$$V_{interpolated} = V_0 + \frac{V_{target} - V_0}{f(p_i)} \quad (2)$$

In the above formula, $V_{interpolated}$ represents the isosurface vertex calculated through the interpolation, $V_0$ represents a scalar value of a vertex of the cube, and $V_{target}$ represents a target isosurface value. In step S350, these isosurface vertices are connected into a triangle to generate the three-dimensional surface model.

Through this embodiment, in the adaptive mesh, an improved Marching Cubes algorithm is applied to extract the isosurface based on the geometric property predicted by the deep learning model. Adaptive meshing can provide the higher resolution in the complex structural area, ensuring that details of the three-dimensional model are clearer and more accurate. The local geometric property is predicted by the deep learning model, and a mesh density is adaptively adjusted to improve the reconstruction accuracy, reduce unnecessary meshing and calculation, and improve overall efficiency of surface reconstruction. Therefore, by combining advantages of deep learning and traditional algorithms, the adaptive Marching Cubes algorithm can better adapt to different types of fracture structures and generate a more stable and reliable three-dimensional model.

In step S130, a reconstructed three-dimensional model of the fracture part is matched and calibrated based on the fracture area of the patient in an actual surgical scene.

In some embodiments, a registration algorithm (for example, a point cloud registration algorithm) can be used to match the reconstructed three-dimension model with the fracture area of the patient in the actual surgical scene, and a fine adjustment can be made by comparing key points and feature areas to ensure that the model is highly consistent with the actual fracture area. In addition, the matching and calibration process can be displayed in real time in the AR glasses, allowing the doctor to make a fine adjustment and a confirmation.

Therefore, through precise matching and calibration, it is ensured that the three-dimensional model is highly consistent with the actual surgical scene, allowing the doctor to accurately refer to the model during the operation. This improves accuracy and safety of the reduction.

It should be noted that various non-restrictive matching and calibration methods can be used, such as a point cloud depth image matching technology, to match the three-dimensional model of the fracture part and the actual surgical scene and calibrate the three-dimensional model of the fracture part.

Figure 4:
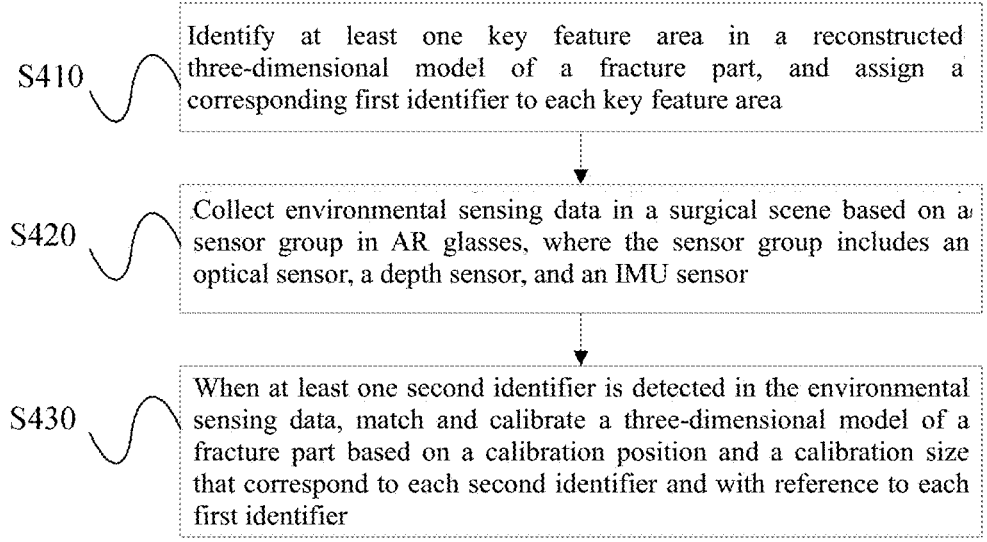
FIG. 4 is an operation flowchart of an example of matching and calibrating a reconstructed three-dimensional model of a fracture part based on a fracture area of a patient in an actual surgical scene according to an embodiment of the present disclosure.

FIG. 4 is an operational flowchart of an example of matching and calibrating the reconstructed three-dimensional model of the fracture part based on the fracture area of the patient in the actual surgical scene according to an embodiment of the present disclosure. As shown in FIG. 4, in step S410, at least one key feature area in the reconstructed three-dimensional model of the fracture part is identified, and a corresponding first identifier is assigned to each key feature area. More specifically, a detailed feature analysis is performed on the reconstructed three-dimensional model of the fracture part, for example, image processing and computer vision technologies are used to extract geometric features such as a feature point, a feature line, and a feature surface in the three-dimensional model of the fracture part to identify the key feature area. In combination with a business scenario, the first identifier can be a fracture line, for example, a start point and an end point of the fracture line in the three-dimensional model are identified as the first identifier. In addition, the first identifier can also be a key feature area such as an articular surface or a condyle. In step S420, based on a sensor group in the AR glasses, environmental sensing data in the surgical scene is collected, and the sensor group includes an optical sensor, a depth sensor and an IMU sensor. A real-time image of the surgical scene is captured by the optical sensor, depth information of the surgical scene is obtained by the depth sensor, and device posture data is captured by the IMU sensor. Furthermore, after a plurality of types of sensor sampling data are obtained, it is also necessary to perform time synchronization and space matching on the data of the optical sensor, the depth sensor, and the IMU sensor to generate a comprehensive data stream of the surgical scene. In step S430, when at least one second identifier is detected in the environmental sensing data, the three-dimensional model of the fracture part is matched and calibrated based on a calibration position and a calibration size that correspond to each second identifier and with reference to each first identifier. The second identifier is preset at a specific position in the fracture area of the patient in the surgical scene, and the specific position is associated with the key feature area. More specifically, the doctor can pre-place the second identifier such as a reflective ball, a QR code, or a surgical nail in the key feature area (for example, the fracture line, the articular surface, the condyle).

In this embodiment, feature analysis is performed on the reconstructed three-dimensional model of the fracture part, and a stable and easily identifiable feature area (such as the fracture line, the articular surface, the condyle, or the like) is selected as the first identifier to ensure accuracy of the identifier. The data of the optical sensor, the depth sensor, and the IMU sensor is used to provide comprehensive information of the surgical scene and achieve high-precision environmental perception. The second identifier in the surgical scene is quickly detected by the image processing algorithm, and a correlation between the first identifier and the second identifier is used to automate the matching and calibration process and reduce manual operating time. Through this embodiment, real-time data of the IMU sensor and the depth sensor are used to dynamically adjust the matching of the three-dimensional model with the surgical scene to ensure continued effectiveness of matching the three-dimensional model. In combination with the business scenario, during the operation, when a posture of the AR glasses changes or the patient moves slightly, the doctor can respond to the change in the surgical process in a timely manner by dynamically adjusting and calibrating the three-dimensional model in real time, to ensure safety and stability of the operation.

In step S140, the matched and calibrated three-dimensional model of the fracture part and a corresponding fracture type and fracture surgery requirement are input into a fracture reduction path planning model to determine at least one corresponding optimized fracture reduction path.

In some embodiments, the matched and calibrated three-dimensional model of the fracture part is input into the fracture reduction path planning model, such that the platform can fully capture spatial orientation information of different bone block modules in the fracture area. Herein, the fracture reduction path planning model includes a cascaded RL module and a multi-physics field simulation optimization module. A state, an action space, and a reward function of the RL module are defined by the input fracture type and surgical requirement, the RL module is used to generate an initial reduction path, and the multi-physics field simulation optimization module is used to simulate and optimize a stress distribution of the initial path. Thus, the RL module and the multi-physics field simulation optimization module are used to generate an optimized fracture reduction path to ensure accuracy and smoothness of the path and meet physiological and mechanical requirements, thereby reducing damage to a surrounding tissue and improving a reduction effect.

In step S150, each optimized fracture reduction path is rendered, and a target fracture reduction path is determined according to a detected interactive instruction.

In some embodiments, each reduction path is rendered in the AR glasses, providing an intuitive three-dimensional view and path information. Then, through gesture recognition or a voice command, the doctor is allowed to perform path selection and interaction. Then, according to the doctor's interactive instruction, the final target reduction path is determined, and real-time guidance is provided during the operation. Thus, through an augmented reality technology, the reduction path is intuitively visualized, allowing the doctor to quickly select an optimal path. This reduces operation time and difficulty, and improves a success rate and safety of the operation.

The fracture reduction path planning method provided in the embodiments of the present disclosure can provide a unified operation reference for different doctors, reducing dependence of a surgical result on doctor experience. In addition, through standardized reduction path planning, repeatability and standardization of a surgical operation can be improved, which is helpful to promote minimally invasive and precise fracture reduction surgery and improve an overall medical level.

Figure 5:
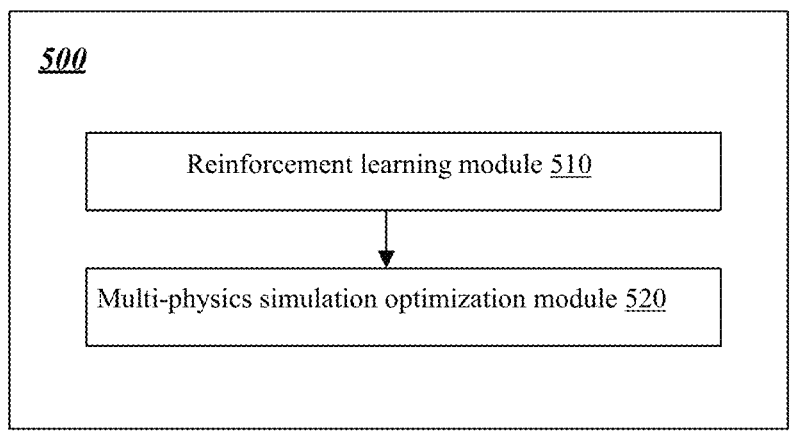
FIG. 5 is a structural block diagram of an example of a fracture reduction path planning model according to an embodiment of the present disclosure.

FIG. 5 is a structural block diagram of an example of a fracture reduction path planning model according to an embodiment of the present disclosure.

As shown in FIG. 5, the fracture reduction path planning model 500 includes a cascaded RL module 510 and a multi-physics field simulation optimization module 520.

The RL module 510 is configured to determine at least one initial reduction path based on a fracture type, a matched and calibrated three-dimensional model of a fracture part, and a fracture surgery requirement. More specifically, a state of the RL module 510 is defined based on a geometric feature of the matched and calibrated three-dimensional model of the fracture part, relative orientation information of a bone block, and the fracture type, and an action space of the RL module is defined based on movement of the bone block, rotation of the bone block, and force applied by the bone block. A reward function of the RL module 510 is defined based on the fracture surgery requirement. The fracture surgery requirement includes a reduction accuracy requirement, a path smoothness requirement, and a physiological constraint requirement.

More specifically, an RL environment based on a three-dimensional model is established, and a large number of simulation trainings are carried out through an RL algorithm to generate a plurality of preliminary reduction paths that meet a reward constraint.

Each initial reduction path is input into the multi-physics field simulation optimization module 520 to perform stress distribution simulation on each initial reduction path through finite element analysis, and the corresponding initial path is optimized and adjusted based on a simulation result to determine at least one corresponding optimized fracture reduction path.

More specifically, the stress distribution simulation is performed on the preliminary path through the finite element analysis to evaluate mechanical feasibility of the path. In addition, dynamic response analysis is performed on the path to ensure stability of the path in an actual operation. Then, the preliminary path is optimized and adjusted based on the simulation result to generate at least one optimized fracture reduction path that meets a condition.

Herein, the RL algorithm is used to generate an optimized fracture reduction path, and the reduction path can be optimized through continuous simulation and feedback learning to achieve a best effect. In addition, a multi-physics field simulation technology is used to perform mechanical simulation and adjustment optimization on the generated reduction path.

In this embodiment, the RL algorithm is used to perform preliminary path planning on a fracture area, and the preliminary path is input into a multi-physics field simulation model for mechanical simulation and optimization. With adaptability and flexibility, the RL algorithm can optimize the path in real time, but it may lack mechanical feasibility and safety in the actual operation. The multi-physics field simulation model can effectively combine mechanical simulation and actual operating conditions to provide a more accurate and safer path, but requires a high computational cost and a complex simulation model. Through this embodiment, the fracture reduction path planning model effectively integrates advantages of the RL algorithm and the multi-physics field simulation model, and achieves adaptative path planning and accurate and safe mechanical simulation and optimization. The fracture reduction path planning model can not only provide the preliminary path planning, but also further optimize the path through the mechanical simulation to ensure feasibility and safety of the actual operation, and has higher practical value.

The reward function R of the RL module 510 is expressed as follows:

$$R = r_{accuracy} + r_{smoothness} + r_{physiology} \quad (3)$$

$$r_{accuracy} = -\alpha \cdot \|M_{target} - M_{current}\| \quad (4)$$

$$r_{smoothness} = -\beta \cdot \sum_{i=1}^{N-1} \|\kappa_i\| \quad (5)$$

$$r_{physiology} = -\gamma \cdot \sum_{i=1}^{N} \max(0, \sigma_i - \sigma_{limit}) \quad (6)$$

In the above formulas, $r_{accuracy}$ represents a reduction accuracy reward term, which is used to reflect a position error of the bone block after reduction; $r_{smoothness}$ represents a path smoothness reward item, which is used to reflect smoothness of the path; $r_{physiology}$ represents a physiological constraint reward item, which is used to ensure that the path meets physiological and mechanical requirements to avoid damaging a surrounding tissue; $M_{target}$ represents target position coordinates, which indicates a position in which the bone block should reach after the reduction; $M_{current}$ represents current position coordinates of the bone block, which indicates a position of the bone block at a current moment; α represents an accuracy adjustment parameter, which is used to adjust an impact of reduction accuracy on a total reward; $\kappa_i$ represents a path curvature, which indicates a curvature value of an $i^{th}$ path node on the path; N represents a total quantity of path nodes; β represents a smoothness adjustment parameter, which is used to adjust an impact of path smoothness on the total reward; $\sigma_i$ represents a stress value of the $i^{th}$ path node on the path; $\sigma_{limit}$ represents a physiological stress limit, where damage is caused to a tissue when stress on the path exceeds the limit; and γ represents a physiological constraint adjustment parameter, which is used to adjust an impact of a physiological constraint on the total reward.

The design explanation and optimization description of the above reward function are as follows:

The position error of the bone block after the reduction is reflected by a reduction accuracy reward. A smaller the position error leads to a higher reward. In this way, the RL module can effectively optimize the fracture reduction path to make a position of the bone block after the reduction closer to a target position, thereby significantly improving a success rate of the operation and reducing a risk of poor bone block alignment after surgery.

The smoothness of the path is reflected by a path smoothness reward. A smoother path leads to a higher reward. In this way, the RL module can generate a smoother reduction path, avoiding an overly complex and tortuous path. This makes the reduction operation smoother, improving smoothness of the operation, reducing unnecessary adjustments during the operation, and avoiding an operational error caused by a complex path.

A physiological constraint reward ensures that the path meets the physiological and mechanical requirements, avoiding damage to the surrounding tissue during an operation of moving the bone block. In this way, the RL module can ensure that the generated reduction path is mechanically safe and feasible, and ensure that no additional damage is caused to the surrounding tissue during the operation, thereby ensuring physiological safety of the operation, and reducing occurrence of a postoperative complication.

Therefore, by adopting the above-mentioned reward function, the RL module can achieve higher reduction accuracy, a smoother surgical path, and higher physiological safety in fracture reduction path planning, which not only improves the success rate and safety of the operation, but also significantly reduces postoperative complications and promotes rapid recovery of a patient, providing strong support for the development of smart medical technologies.

In some examples of the embodiments of the present disclosure, the multi-physics field simulation optimization module is configured to perform the following operations:

A finite element model is established based on a geometric model, a fracture type, and a material property of the matched and calibrated three-dimensional model of the fracture part.

Herein, the material property includes material properties of the bone block and other surrounding tissues, which can be input through the system or inferred based on the patient's basic information in the fracture surgery requirement, such as gender and age, and should not be limited herein.

More specifically, a geometric model of the bone block is established using three-dimensional reconstruction data, and the material property is defined based on physical properties of a bone and a soft tissue. A mechanical boundary condition is then applied to each path node on the initial path, and a contact relationship and a constraint between the bone blocks are defined to simulate an external force and a moment that are applied during the surgery.

The mechanical boundary condition is applied to each node on the initial reduction path to calculate a stress distribution on the path through the finite element analysis:

$$\sigma = D(C) \cdot \dot{o}, \qquad \text{Formula (7)}$$

$$\dot{o} = \nabla_s u = \begin{bmatrix} \dfrac{\partial u_x}{\partial x} & \dfrac{1}{2}\left(\dfrac{\partial u_x}{\partial y} + \dfrac{\partial u_y}{\partial x}\right) & \dfrac{1}{2}\left(\dfrac{\partial u_x}{\partial z} + \dfrac{\partial u_z}{\partial x}\right) \\ \dfrac{1}{2}\left(\dfrac{\partial u_y}{\partial x} + \dfrac{\partial u_x}{\partial y}\right) & \dfrac{\partial u_y}{\partial y} & \dfrac{1}{2}\left(\dfrac{\partial u_y}{\partial z} + \dfrac{\partial u_z}{\partial y}\right) \\ \dfrac{1}{2}\left(\dfrac{\partial u_z}{\partial x} + \dfrac{\partial u_x}{\partial z}\right) & \dfrac{1}{2}\left(\dfrac{\partial u_z}{\partial y} + \dfrac{\partial u_y}{\partial z}\right) & \dfrac{\partial u_z}{\partial z} \end{bmatrix} \quad (8)$$

In the formula, σ represents a stress vector, which describes a stress state inside the bone block; D(C) represents an elastic matrix of a material, which depends on a material property matrix C, where the elastic matrix represents an elastic property of the material in each directions; C represents the material property matrix, which contains an anisotropic property of a bone material; o represents a strain vector, which describes a deformation state of the bone block under the action of external force; $\nabla_s$ represents a symmetric gradient operator, which is used to calculate a symmetric gradient of a displacement vector u; u represents the displacement vector, which represents a displacement of the material in each direction; and $u_x$, $u_y$, $u_z$ represent displacement components in x, y, and z directions respectively.

Herein, a linear elastic mechanics relationship is used to describe a relationship between stress and strain, and an anisotropic material property is also considered. In addition, in order to improve accuracy of the model, D is expanded to a matrix containing nonlinear term, considering elastic moduli of the bone block in different directions:

$$D(C) = \begin{bmatrix} C_{11} & C_{12} & C_{13} & 0 & 0 & 0 \\ C_{12} & C_{22} & C_{23} & 0 & 0 & 0 \\ C_{13} & C_{23} & C_{33} & 0 & 0 & 0 \\ 0 & 0 & 0 & C_{44} & 0 & 0 \\ 0 & 0 & 0 & 0 & C_{55} & 0 \\ 0 & 0 & 0 & 0 & 0 & C_{66} \end{bmatrix} \quad (9)$$

In the above formula, $C_{ij}$ represents a term in the material property matrix, which depends on the anisotropic property of the bone material.

In complex fracture reduction surgery, a doctor needs to understand stress distributions of the bone block under different reduction paths. Through this embodiment, an anisotropic material property and nonlinear contact stress of the bone block are taken into account in a stress calculation process, and stress distributions of the bone block and the surrounding tissue can be calculated more accurately, avoiding selection of a path that will cause stress concentration at a fracture site or its surrounding tissue and may cause secondary damage.

The dynamic response analysis is performed the initial reduction path:

$$M \cdot \ddot{u} + (\lambda M + \mu K) \cdot \dot{u} + K(u) \cdot u + N_{contact}(u) + N_{friction}(\dot{u}) = F(t) \quad (10)$$

In the above formula, M represents a mass matrix, which describes mass distributions of the bone block and the surrounding tissue; $\ddot{u}$ represents an acceleration vector, which represents an acceleration of the bone block in each direction; $\lambda M$ represents a mass damping term, $\lambda$ represents a mass damping coefficient; $\mu K$ represents a stiffness damping term, $\mu$ represents a stiffness damping coefficient; $K(u)$ represents a nonlinear stiffness matrix, which depends on the displacement u; u represents a velocity vector, which represents a velocity of the bone block in each direction; $N_{contact}(u)$ represents a contact force term, which describes contact force between the bone blocks; $N_{friction}(\dot{u})$ represents a friction force term, which describes friction force between the bone blocks; and F(t) represents a time-dependent external force vector, which represents external force applied during the operation.

In some embodiments, the mass matrix is calculated based on a material property and a geometric shape of the bone block, a damping matrix is calculated based on a damping property of the bone block, and the stiffness matrix is calculated based on a stiffness property and the geometric shape of the bone block, and a dynamic equation is used for simulation to calculate a dynamic response of the bone block during the reduction. Thus, the dynamic response analysis is performed on the path to ensure stability and robustness of the path in the actual operation.

During the surgery, the bone block may be subjected to various dynamic loads (such as force of surgical tools and a slight movement of the patient). Herein, an advanced dynamic equation provided by the formula (10) combines a nonlinear force term and a damping effect to more accurately simulate the dynamic loads and mechanical responses of the bone block during the surgery, allowing the doctor to foresee and avoid possible mechanical instability and ensure a smooth surgical procedure.

The initial reduction path is optimized and adjusted based on a dynamic response analysis result to ensure mechanical safety of the reduction path in the actual operation.

In some embodiments, a variety of non-restrictive target optimization algorithms, such as a genetic algorithm and a particle swarm optimization algorithm, can also be used to solve the problem. Based on a stress distribution result, a position and a direction of the path node are adjusted, and a stress distribution of an adjusted path is recalculated to verify safety of the path, and the optimization steps are repeated until the path meets a requirement of an optimization objective function.

In this embodiment, based on simulation results of the stress distribution and the dynamic response, the initial reduction path can be optimized for a plurality of iterations to ensure that a final path is optimal in terms of accuracy, smoothness, and mechanical safety. In combination with a business scenario, before the surgery, through repeated simulation and path optimization, a reduction path with excellent simulation performance can be determined. This path can not only accurately reduce the bone block, but also reduce the damage to the surrounding tissue, thereby improving a success rate of the surgery and a recovery speed of the patient. In addition, by considering the nonlinear property of the material and the nonlinear contact force between the bone blocks, the system can better adapt to different types of fractures and complex surgical scenarios. Therefore, when dealing with a variety of complex fracture types (such as a plurality of fractures and a comminuted fracture), the system can provide targeted stress analysis and path optimization to ensure a best operation path for each surgical scenario. In addition, during the surgery, the bone block may produce a slight vibration due to an operation performed by a tool or a movement of the patient. By accurately simulating the damping effect, the system can better predict and offset the vibration and the mechanical instability that may occur during the surgery. Based on an accurate damping simulation result, the path can be adjusted in time to reduce an impact of vibration on the surgery and improve the stability of the operation.

In some examples of the embodiments of the present disclosure, in order to better combine the dynamic response analysis result, a more comprehensive optimization objective function formula may be adopted.

More specifically, a solution formula for a value of an optimization objective function min F(p, q) is as follows:

$$\min F(p, q) = w_1 \cdot E_{accuracy} + w_2 \cdot E_{smoothness} + w_3 \cdot E_{stress} + w_4 \cdot E_{dynamic} \quad (11)$$

$$E_{accuracy} = \sum_{i=1}^{N} \|p_{target,i} - p_{current,i}\|^2 \quad (12)$$

$$E_{smoothness} = \sum_{i=1}^{N-1} \|p_{current,i+1} - 2p_{current,i} + p_{current,i-1}\|^2 \quad (13)$$

$$E_{stress} = \sum_{i=1}^{N} \max(0, \sigma_i - \sigma_{limit})^2, \quad \text{Formula (14)}$$

$$E_{dynamic} = \quad (15)$$

$$\sum_{i=1}^{N} \left( \|\ddot{u}_i\|^2 + \|\dot{u}_i\|^2 + \|u_i\|^2 \right) + \sum_{i=1}^{N} \left( \|N_{contact}(u_i)\|^2 + \|N_{friction}(\dot{u}_i)\|^2 \right)$$

In the above formulas, $E_{accuracy}$ represents a reduction accuracy error term; $E_{smoothness}$ represents a path smoothness error term; $E_{stress}$ represents a stress safety error term; $E_{dynamic}$ represents a dynamic response error term; $w_1$, $w_2$, $w_3$, $w_4$ represent weight parameters, which are used to measure importance of the corresponding error terms in overall optimization; $p_{target,i}$ represents target position coordinates of the $i^{th}$ path node, $p_{current,i}$ represents current path position coordinates of the $i^{th}$ path node; $p_{current,i+1}$ and $p_{current,i-1}$ represent position coordinates of adjacent path nodes of the $i^{th}$ path node; $\ddot{u}_i$ represents an acceleration of the $i^{th}$ path node; $\dot{u}_i$ represents a velocity of the $i^{th}$ path node; $u_i$ represents a displacement of an $i^{th}$ point on the path; $N_{contact}(u_i)$ represents contact force of the $i^{th}$ path node; and $N_{friction}(\dot{u}_i)$ represents friction force of the $i^{th}$ path node.

The specific implementation details are described in context as follows: First, the initial reduction path is generated using the RL module. Then, the dynamic response analysis is performed using the advanced dynamic equation to calculate the displacement, the velocity, the acceleration, the contact force, and the friction force of each path point. Furthermore, based on the dynamic response analysis result, the optimization objective function min F(p, q) is calculated. Finally, the position and the direction of the path node are adjusted based on the objective function value.

The stress safety error term $E_{stress}$ and the dynamic response error term $E_{dynamic}$ in the optimization objective function can effectively avoid stress concentration and dynamic instability caused by improper path selection, ensuring mechanical safety of the bone block and the surrounding tissue during the reduction. Therefore, in the complex fracture reduction surgery, a most mechanically safe reduction path can be selected through accurate stress analysis and dynamic response evaluation to avoid secondary damage during and after the surgery.

Based on the reduction accuracy error term $E_{accuracy}$ and the path smoothness error term $E_{smoothness}$ in the optimization objective function, a smoother and more accurate reduction path can be generated, improving smoothness and a success rate of a surgical operation. Therefore, before the surgery, through the repeated simulation and path optimization, at least one reduction path with excellent simulation performance can be determined, which can not only accurately reduce the bone block, but also reduce the damage to the surrounding tissue, thereby improving the success rate of the surgery and the recovery speed of the patient.

The dynamic response error term $E_{dynamic}$ in the optimization objective function can ensure that path mechanical response during the surgery is stable, avoiding instability during the surgery. In addition, through real-time monitoring and dynamic adjustment, the reduction path can be adjusted in time based on an unexpected situation during the surgery to ensure that the surgery is performed smoothly. Therefore, during the surgery, the platform system can monitor the dynamic response of the bone block in real time and provide a real-time adjustment suggestion to help the doctor adjust an operation path in time to ensure stability and safety of the surgery.

Therefore, based on the error terms in the optimization objective function, the system can adapt to different types of fractures and complex surgical scenarios, provide accurate path optimization and mechanical analysis, and improve the success rate of the surgery and the recovery effect of the patient. In this way, when dealing with a variety of complex fracture types (such as a plurality of fractures and a comminuted fracture), the platform system can provide targeted stress analysis and path optimization to ensure that an operation path output by the platform system in each surgical scenario can have better performance.

It should be noted that in the fracture reduction path planning model, the reduction path is optimized and constrained by the RL module and the simulation analysis module respectively, which can comprehensively utilize advantages of the two technical means. For example, both the RL module and the simulation analysis module contain constraints on reduction accuracy and path smoothness. In this way, A same goal is constrained by using both a reward function of the RL module and an objective function of the simulation analysis module to fully utilize advantages of both the RL module and the simulation analysis module to improve an overall path planning effect.

Through the dual constraints of the RL module and the simulation analysis module, robustness of path planning can be improved and reliability of the path in different environments and conditions can be ensured. The RL module and the simulation analysis module optimize different goals of the path (such as accuracy, smoothness, and mechanical safety) separately, and the advantages of both the RL module and the simulation analysis module are comprehensively utilized to achieve global optimization of a plurality of goals. In addition, the path generated by the RL module is calibrated and optimized through the simulation analysis module to ensure the accuracy and the safety of the path in the actual operation and avoid infeasibility of the path generated by the algorithm in a physical implementation. Therefore, through the dual constraints of the RL module and the simulation analysis module, the robustness of the path planning can be improved and the reliability of the path in the different environments and conditions can be ensured.

It should be noted that, for the aforementioned method embodiments, for the sake of simplicity of description, they are all expressed as a series of actions combined, but those skilled in the art should be aware that the present disclosure is not limited by the described order of actions, because according to the present disclosure, some steps can be performed in another order or simultaneously. In addition, those skilled in the art should also be aware that the embodiments described in the specification are all preferred embodiments, and the actions and modules involved are not necessarily required by the present disclosure. In the above embodiments, the description of each embodiment has its own emphasis. For parts that are not described in detail in an embodiment, reference may be made to the relevant description of other embodiments.

Figure 6:
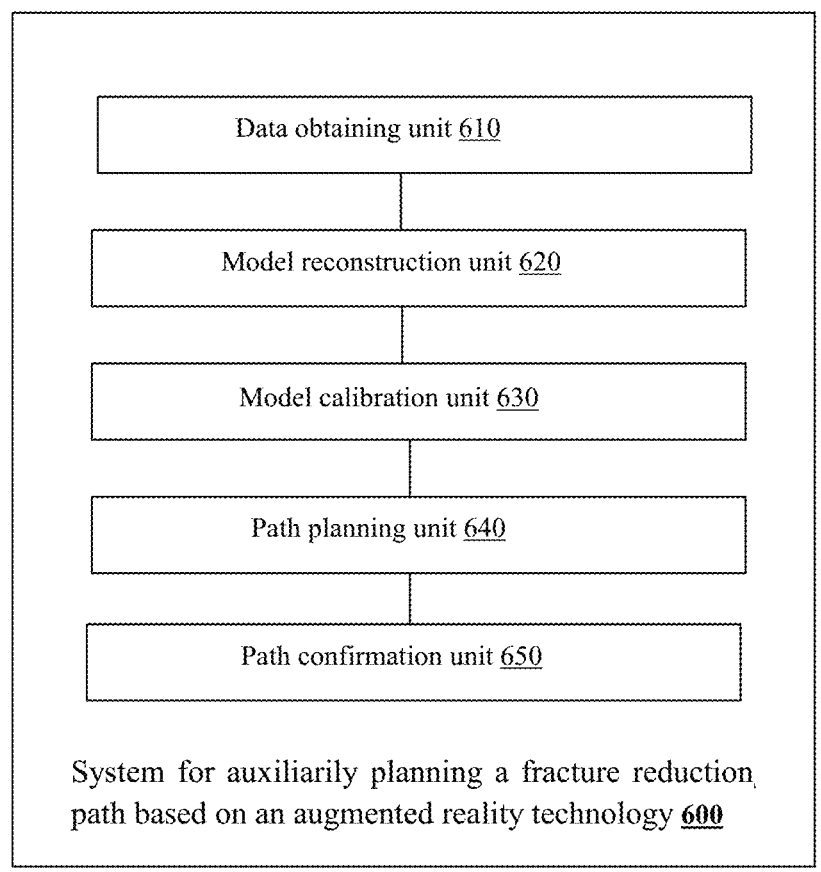
FIG. 6 is a structural block diagram of an example of a system for auxiliarily planning a fracture reduction path based on an augmented reality technology according to an embodiment of the present disclosure.

FIG. 6 is a structural block diagram of an example of a system for auxiliarily planning a fracture reduction path based on an augmented reality technology according to an embodiment of the present disclosure.

As shown in FIG. 6, the system 600 for auxiliarily planning a fracture reduction path based on an augmented reality technology includes a data obtaining unit 610, a model reconstruction unit 620, a model calibration unit 630, a path planning unit 640, and a path confirmation unit 650.

The data obtaining unit 610 is configured to obtain fracture image data for a fracture area of a patient, and the fracture image data includes CT data and X-ray data.

The model reconstruction unit 620 is configured to reconstruct a three-dimensional model of a fracture part based on the fracture image data. The three-dimensional model of the fracture part includes a plurality of bone block modules, and each of the bone block modules is marked with a corresponding position, boundary, and color.

The model calibration unit 630 is configured to match and calibrate a reconstructed three-dimensional model of the fracture part based on the fracture area of the patient in an actual surgical scene.

The path planning unit 640 is configured to input a matched and calibrated three-dimensional model of the fracture part and a corresponding fracture type and fracture surgery requirement into a fracture reduction path planning model to determine at least one corresponding optimized fracture reduction path.

The path confirmation unit 650 is configured to render each optimized fracture reduction path and determine a target fracture reduction path according to a detected interactive instruction.

The fracture reduction path planning model includes a cascaded RL module and a multi-physics field simulation optimization module.

The RL module is configured to determine at least one initial reduction path based on the fracture type, the matched and calibrated three-dimensional model of the fracture part, and the fracture surgery requirement, where a state of the RL module is defined based on a geometric feature of the matched and calibrated three-dimensional model of the fracture part, spatial relative orientation information of a bone block, and the fracture type, an action space of the RL module is defined based on movement, rotation, and force of the bone block, a reward function of the RL module is defined based on the fracture surgery requirement, and the fracture surgery requirement includes a reduction accuracy requirement, a path smoothness requirement, and a physiological constraint requirement; and input each of the at least one initial reduction path into the multi-physics field simulation optimization module to perform stress distribution simulation on each of the at least one initial reduction path through finite element analysis, and optimize and adjust a corresponding initial path based on a simulation result to determine the at least one corresponding optimized fracture reduction path.

The reward function R of the RL module is expressed as follows:

$$R = r_{accuracy} + r_{smoothness} + r_{physiology}$$

$$r_{accuracy} = -\alpha \cdot \|M_{target} - M_{current}\|$$

$$r_{smoothness} = -\beta \cdot \sum_{i=1}^{N-1} \|\kappa_i\|$$

$$r_{physiology} = -\gamma \cdot \sum_{i=1}^{N} \max(0, \sigma_i - \sigma_{limit})$$

In the above formulas, $r_{accuracy}$ represents a reduction accuracy reward item, which is used to reflect a position error of the bone block after reduction; $r_{smoothness}$ represents a path smoothness reward item, which is used to reflect smoothness of a path; $r_{physiology}$ represents a physiological constraint reward item, which is used to ensure that the path meets physiological and mechanical requirements to avoid damaging a surrounding tissue; $M_{target}$ represents target position coordinates, which indicates a position in which the bone block should reach after the reduction; $M_{current}$ represents current position coordinates of the bone block, which indicates a position of the bone block at a current moment; $\alpha$ represents an accuracy adjustment parameter, which is used to adjust an impact of reduction accuracy on a total reward; $\kappa_i$ represents a path curvature, which indicates a curvature value of an $i^{th}$ path node on the path; N represents a total quantity of path nodes; $\beta$ represents a smoothness adjustment parameter, which is used to adjust an impact of path smoothness on the total reward; $\sigma_i$ represents a stress value of the i th path node on the path; $\sigma_{limit}$ represents a physiological stress limit, where damage is caused to a tissue when stress on the path exceeds the limit; and $\gamma$ represents a physiological constraint adjustment parameter, which is used to adjust an impact of a physiological constraint on the total reward.

In some embodiments, the embodiments of the present disclosure provide a non-volatile computer-readable storage medium that stores at least one program including an execution instruction. The execution instruction can be read and executed by an electronic device (including but not limited to a computer, a server, a network device, or the like) to execute the above-mentioned method for auxiliarily planning a fracture reduction path based on an augmented reality technology in the present disclosure.

In some embodiments, the embodiments of the present disclosure also provide a computer program product, which includes a computer program stored on a non-volatile computer-readable storage medium. The computer program includes a program instruction. When the program instruction is executed by a computer, the computer executes the above-mentioned method for auxiliarily planning a fracture reduction path based on an augmented reality technology.

In some embodiments, the embodiments of the present disclosure also provide an electronic device, including: at least one processor, and a memory communicatively connected to the at least one processor. The memory stores an instruction executable by the at least one processor, and the instruction is executed by the at least one processor to execute the method for auxiliarily planning a fracture reduction path based on an augmented reality technology.

Figure 7:
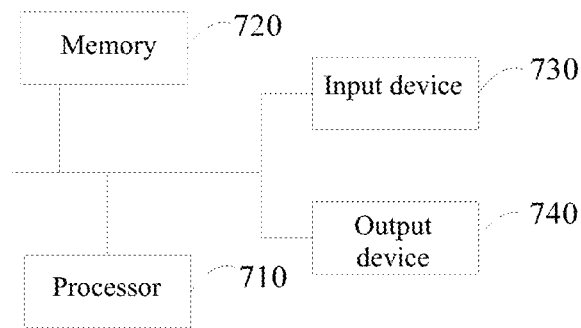
FIG. 7 is a schematic structural diagram of an electronic device according to an embodiment of the present disclosure.

FIG. 7 is a schematic diagram of a hardware structure of an electronic device for executing a method for auxiliarily planning a fracture reduction path based on an augmented reality technology according to another embodiment of the present disclosure. As shown in FIG. 7, the device includes: at least one processor 710 and a memory 720, where one processor 710 is taken as an example in FIG. 7.

The device for executing the method for auxiliarily planning a fracture reduction path based on an augmented reality technology may further include: an input device 730 and an output device 740.

The processor 710, the memory 720, the input device 730, and the output device 740 may be connected via a bus or other means, and FIG. 7 takes the connection via a bus as an example.

The memory 720, as a non-volatile computer-readable storage medium, can be configured to store non-volatile software programs, non-volatile computer executable programs, and modules, such as program instructions/modules corresponding to the method for auxiliarily planning a fracture reduction path based on an augmented reality technology in the embodiments of the present disclosure. The processor 710 executes various functional applications and data processing of a server by running the non-volatile software programs, instructions, and modules stored in the memory 720, that is, implements the method for auxiliarily planning a fracture reduction path based on an augmented reality technology in the above method embodiments.

The memory 720 may include a program storage area and a data storage area. The program storage area may store an operating system and an application required for at least one function. The data storage area may store data created based on use of the electronic device and the like. In addition, the memory 720 may include a high-speed random access memory, and may also include a non-volatile memory, such as at least one disk storage device, a flash memory device, or another non-volatile solid-state storage device. In some embodiments, the memory 720 may optionally include a memory remotely arranged relative to the processor 710, and the remote memory may be connected to the electronic device via a network. Examples of the above-mentioned network include, but are not limited to, the Internet, an intranet, a local area network, a mobile communication network, and a combination thereof.

The input device 730 may receive input digital or character information and generate signals related to user settings and function control of the electronic device. The output device 740 may include a display device such as a display screen.

At least one module is stored in the memory 720, and is executed by the at least one processor 710 to execute the random-access method for auxiliarily planning a fracture reduction path based on an augmented reality technology in any one of the above method embodiments.

The above-mentioned product can execute the method provided in the embodiments of the present disclosure, and has corresponding functional modules and beneficial effects of executing the method. For technical details not fully described in the embodiments, reference may be made to the method provided in the embodiments of the present disclosure.

The electronic device in the embodiments of the present disclosure exists in various forms, including but not limited to:

(1) Mobile communication device: This type of device is characterized by having a mobile communication function and is mainly used to provide voice and data communication. This type of device includes: a smart phone, a multimedia phone, a functional phone, a low-end phone, and the like.

(2) Ultra-mobile personal computer device: This type of device belongs to a category of personal computers, has computing and processing functions, and generally also supports mobile Internet access. This type of device includes: a PDA, a MID, and UMPC, and other devices.

(3) Portable entertainment device: This type of device can display and play multimedia content. This type of device includes an audio play, a video player, a handheld game console, an e-book, a smart toy, and a portable vehicle-mounted navigation device.

(4) Other onboard electronic devices with a data interaction function, such as an onboard device installed in a vehicle.

The device embodiments described above are merely illustrative. Units described as separate components may or may not be physically separated, and components shown as units may or may not be physical units, that is, may be located in one place or distributed on a plurality of network units. Some or all of the modules may be selected according to actual needs to achieve the objectives of the solutions of the embodiments.

Based on the description of the above implementations, those skilled in the art can clearly understand that each implementation can be implemented by means of software plus a general hardware platform, or certainly, by hardware. Based on this understanding, the above technical solutions in essence or in other words, the part that contributes to the relevant technology, can be embodied in a form of a software product. The computer software product can be stored in a computer-readable storage medium, such as a ROM/RAM, a magnetic disk, an optical disk, or the like, and includes several instructions for enabling a computer device (which may be a personal computer, a server, a network device, or the like) to execute the method described in each embodiment or some parts of the embodiments.

Finally, it should be noted that the above embodiments are only used to illustrate the technical solutions of the present disclosure, rather than to limit the present disclosure. Although the present disclosure has been described in detail with reference to the aforementioned embodiments, those skilled in the art should understand that they can still modify the technical solutions described in the aforementioned embodiments, or make equivalent replacements for some of the technical features therein. However, these modifications or replacements do not deviate the essence of the corresponding technical solutions from the spirit and scope of the technical solutions of the embodiments of the present disclosure.

What is claimed is:

1. A method for auxiliarily planning a fracture reduction path based on an augmented reality technology, wherein the method comprises:

obtaining fracture image data for a fracture area of a patient, wherein the fracture image data comprises computer tomography (CT) data and X-ray data;

reconstructing a three-dimensional model of a fracture part based on the fracture image data, wherein the three-dimensional model of the fracture part comprises a plurality of bone block modules, and each of the bone block modules is marked with a corresponding position, boundary and color;

matching and calibrating a reconstructed three-dimensional model of the fracture part based on the fracture area of the patient in an actual surgical scene;

inputting a matched and calibrated three-dimensional model of the fracture part and a corresponding fracture type and fracture surgery requirement into a fracture reduction path planning model to determine at least one corresponding optimized fracture reduction path; and rendering each of the at least one optimized fracture reduction path, and determining a target fracture reduction path according to a detected interactive instruction;

wherein the fracture reduction path planning model comprises a cascaded reinforcement learning (RL) module and a multi-physics field simulation optimization module, wherein the RL module is configured to determine at least one initial reduction path based on the fracture type, the matched and calibrated three-dimensional model of the fracture part, and the fracture surgery requirement, wherein a state of the RL module is defined based on a geometric feature of the matched and calibrated three-dimensional model of the fracture part, spatial relative orientation information of a bone block, and the fracture type, an action space of the RL module is defined based on movement, rotation, and force of the bone block, a reward function of the RL module is defined based on the fracture surgery requirement, and the fracture surgery requirement comprises a reduction accuracy requirement, a path smoothness requirement, and a physiological constraint requirement; and input each of the at least one initial reduction path into the multi-physics field simulation optimization module to perform stress distribution simulation on each of the at least one initial reduction path through finite element analysis, and optimize and adjust a corresponding initial path based on a simulation result to determine the at least one corresponding optimized fracture reduction path;

the reward function R of the RL module is expressed as follows:

$$R = r_{accuracy} + r_{smoothness} + r_{physiology}$$

$$r_{accuracy} = -\alpha \cdot \|M_{target} - M_{current}\|$$

$$r_{smoothness} = -\beta \cdot \sum_{i=1}^{N-1} \|\kappa_i\|$$

$$r_{physiology} = -\gamma \cdot \sum_{i=1}^{N} \max(0, \sigma_i - \sigma_{limit})$$

wherein $r_{accuracy}$ represents a reduction accuracy reward term, which is used to reflect a position error of the bone block after reduction; $r_{smoothness}$ represents a path smoothness reward item, which is used to reflect smoothness of a path; $r_{physiology}$ represents a physiological constraint reward item, which is used to ensure that the path meets physiological and mechanical requirements to avoid damaging a surrounding tissue; $M_{target}$ represents target position coordinates, which indicates a position at which the bone block reaches after the reduction; $M_{current}$ represents current position coordinates of the bone block, which indicates a position of the bone block at a current moment; α represents an accuracy adjustment parameter, which is used to adjust an impact of reduction accuracy on a total reward; $\kappa_i$ represents a path curvature, which indicates a curvature value of an $i^{th}$ path node on the path; N represents a total quantity of path nodes; β represents a smoothness adjustment parameter, which is used to adjust an impact of path smoothness on the total reward; $\sigma_i$ represents a stress value of the $i^{th}$ path node on the path, $\sigma_{limit}$ represents a physiological stress limit, wherein damage is caused to a tissue when stress on the path exceeds the limit; and γ represents a physiological constraint adjustment parameter, which is used to adjust an impact of a physiological constraint on the total reward.

2. The method according to claim 1, wherein the multi-physics simulation optimization module is configured to perform following operations:
establishing a finite element model based on a geometric model, a fracture type, and a material property of the matched and calibrated three-dimensional model of the fracture part;
applying a mechanical boundary condition to each node on the initial reduction path to calculate a stress distribution on the path through the finite element analysis:

$$\sigma = D(C) \cdot \dot{o}$$

$$\dot{o} = \nabla_s u = \begin{bmatrix} \frac{\partial u_x}{\partial x} & \frac{1}{2}\left(\frac{\partial u_x}{\partial y} + \frac{\partial u_y}{\partial x}\right) & \frac{1}{2}\left(\frac{\partial u_x}{\partial z} + \frac{\partial u_z}{\partial x}\right) \\ \frac{1}{2}\left(\frac{\partial u_y}{\partial x} + \frac{\partial u_x}{\partial y}\right) & \frac{\partial u_y}{\partial y} & \frac{1}{2}\left(\frac{\partial u_y}{\partial z} + \frac{\partial u_z}{\partial y}\right) \\ \frac{1}{2}\left(\frac{\partial u_z}{\partial x} + \frac{\partial u_x}{\partial z}\right) & \frac{1}{2}\left(\frac{\partial u_z}{\partial y} + \frac{\partial u_y}{\partial z}\right) & \frac{\partial u_z}{\partial z} \end{bmatrix}$$

wherein σ represents a stress vector, which describes a stress state inside the bone block; D(C) represents an elastic matrix of a material, which depends on a material property matrix C, wherein the elastic matrix represents an elastic property of the material in each direction; C represents the material property matrix, which contains an anisotropic property of a bone material; ò represents a strain vector, which describes a deformation state of the bone block under the action of external force; $\nabla_s$ represents a symmetric gradient operator, which is used to calculate a symmetric gradient of a displacement vector u; u represents the displacement vector, which represents a displacement of the material in each direction; and $u_x$, $u_y$, $u_z$ represent displacement components in x, y, and z directions respectively;
performing dynamic response analysis on the initial reduction path:

$$M \cdot \ddot{u} + (\lambda M + \mu K) \cdot \dot{u} + K(u) \cdot u + N_{contact}(u) + N_{friction}(\dot{u}) = F(t)$$

wherein M represents a mass matrix, which describes mass distributions of the bone block and the surrounding tissue; ü represents an acceleration vector, which represents an acceleration of the bone block in each direction; λM represents a mass damping term, λ represents a mass damping coefficient; μK represents a stiffness damping term, μ represents a stiffness damping coefficient; K(u) represents a nonlinear stiffness matrix, which depends on the displacement u; u̇ represents a velocity vector, which represents a velocity of the bone block in each direction; $N_{contact}$(u) represents a contact force term, which describes contact force between bone blocks; $N_{contact}$(u) represents a friction force term, which describes friction force between the bone blocks; F(t) represents a time-dependent external force vector, which represents external force applied during the operation; and
optimizing and adjusting the initial reduction path based on a dynamic response analysis result to ensure mechanical safety of a reduction path in an actual operation.

3. The method according to claim 2, wherein the optimizing and adjusting the initial reduction path based on a dynamic response analysis result comprises:
calculating an optimization objective function value F(p, q) based on the dynamic response analysis result;
adjusting a position and a direction of a path node based on the optimization objective function value F(p, q):

$$p_{current}^{new} = p_{current} - \eta \cdot \nabla_p F(p, q)$$

$$q_{current}^{new} = q_{current} - \eta \cdot \nabla_q F(p, q)$$

wherein $p_{current}$ represents position coordinates of a current path node, $q_{current}$ represents a direction vector of the current path node, $p_{current}^{new}$ represents adjusted path position coordinates, $q_{current}^{new}$ represents an adjusted path direction vector; η represents a learning rate, which is used to control a step size of each adjustment; $\nabla_p F(p, q)$ represents a gradient of an objective function with respect to a path position; and $\nabla_q F(p, q)$ represents a gradient of the objective function with respect to a path direction; and
repeating the dynamic response analysis and path adjustment steps until the objective function converges to a minimum value.

4. The method according to claim 3, wherein a solution formula for a value of an optimization objective function min F(p, q) is as follows:

$$\min F(p, q) = w_1 \cdot E_{accuracy} + w_2 \cdot E_{smoothness} + w_3 \cdot E_{stress} + w_4 \cdot E_{dynamic}$$

$$E_{accuracy} = \sum_{i=1}^{N} \|p_{target,i} - p_{current,i}\|^2$$

$$E_{smoothness} = \sum_{i=1}^{N-1} \|p_{current,i+1} - 2p_{current,i} + p_{current,i-1}\|^2$$

$$E_{stress} = \sum_{i=1}^{N} \max(0, \sigma_i - \sigma_{limit})^2$$

$$E_{dynamic} = \sum_{i=1}^{N} (\|\ddot{u}_i\|^2 + \|\dot{u}_i\|^2 + \|u_i\|^2) + \sum_{i=1}^{N} (\|N_{contact}(u_i)\|^2 + \|N_{friction}(\dot{u}_i)\|^2)$$

wherein $E_{accuracy}$ represents a reduction accuracy error term, $E_{smoothness}$ represents a path smoothness error term, $E_{stress}$ represents a stress safety error term, $E_{dynamic}$ represents a dynamic response error term; $w_1$, $w_2$, $w_3$, $w_4$ represent weight parameters, which are used to measure importance of the corresponding error terms in overall optimization; $p_{target,i}$ represents target position coordinates of the $i^{th}$ path node, $p_{current,i}$ represents current path position coordinates of the $i^{th}$ path node; $p_{current,i+1}$ and $p_{current,i-1}$ represent position coordinates of adjacent path nodes of the $i^{th}$ path node; $\ddot{u}_i$ represents an acceleration of the $i^{th}$ path node; $\dot{u}_i$ represents a velocity of the $i^{th}$ path node; $u_i$ represents a displacement of the $i^{th}$ path node; $N_{contact}(u_i)$ represents contact force of the $i^{th}$ path node; and $N_{friction}(\dot{u}_i)$ represents friction force of the $i^{th}$ path node.

5. The method according to claim 1, wherein the reconstructing a three-dimensional model of the fracture part based on the fracture part image data comprises:
preprocessing and fusing the CT data and the X-ray data in the fracture image data to obtain a superimposed image of the fracture part corresponding in a same coordinate system;
identifying a bone block module and other tissues in the superimposed image of the fracture part, and extracting edge feature points of the bone block module;
processing each of the edge feature points based on a surface reconstruction algorithm to generate a three-dimensional surface model; and
recording a spatial position, a boundary, and a shape of each bone block module in the three-dimensional surface model, and making each bone block module with a corresponding color to obtain the three-dimensional model of the fracture part.

6. The method according to claim 5, wherein the processing each of the edge feature points based on a surface reconstruction algorithm to generate a three-dimensional surface model comprises:
extracting a multi-scale feature from the superimposed image of the fracture part;
inputting the multi-scale feature into a deep learning model to predict a geometric property of a local mesh, wherein the geometric property of the local mesh comprises a scalar value of a vertex of the mesh and an isosurface position of the mesh;
adaptively adjusting a density and a shape of meshing based on a prediction result of the deep learning model to ensure higher resolution in a complex structure area:

$$V_{adaptive} = \sum_{i=1}^{n} f(p_i) \cdot 2^{i-1}$$

wherein $V_{adaptive}$ represents a vertex index value in an adaptive mesh; a local geometric property predicted by the deep learning model is represented by $P=\{p_1, p_2, \ldots, p_n\}$, wherein $p_i$ represents a geometric property of a local area i; and $f(p_i)$ represents a scalar value function that is of the vertex and predicted based on the local geometric property $p_i$;
applying an enhanced marching cubes algorithm in the adaptive mesh to extract an isosurface vertex based on the geometric property predicted by the deep learning model, which specifically comprises:
determining an intersection point of an isosurface on an edge of a cube through interpolation, and using the intersection point as the isosurface vertex:

$$V_{interpolated} = V_0 + \frac{V_{target} - V_0}{f(p_i)}$$

wherein $V_{interpolated}$ represents the isosurface vertex calculated through the interpolation, $V_0$ represents a scalar value of a vertex of the cube, and $V_{target}$ represents a target isosurface value; and
connecting isosurface vertices into a triangle to generate the three-dimensional surface model.

7. The method according to claim 5, wherein the matching and calibrating a reconstructed three-dimensional model of the fracture part based on the fracture area of the patient in an actual surgical scene comprises:
identifying at least one key feature region in the reconstructed three-dimensional model of the fracture part, and assigning a corresponding first identifier to each key feature region;
collecting environmental sensor data in the surgical scene based on a sensor group in AR glasses, wherein the sensor group comprises an optical sensor, a depth sensor, and an IMU sensor; and
when at least one second identifier is detected in the environmental sensing data, matching and calibrating the three-dimensional model of the fracture part based on a calibration position and a calibration size that correspond to each of the at least one second identifier and with reference to each first identifier, wherein the second identifier is preset at a specific position in the fracture area of the patient in the surgical scene, and the specific position is associated with the key feature area.

8. A system for auxiliarily planning a fracture reduction path based on an augmented reality technology, configured to implement the method according to claim 1, wherein the system comprises:
a data acquisition unit configured to obtain fracture image data for a fracture area of a patient, wherein the fracture image data comprises CT data and X-ray data;
a model reconstruction unit configured to reconstruct a three-dimensional model of the fracture part based on the fracture image data, wherein the three-dimensional model of the fracture part comprises a plurality of bone block modules, and each of the bone block modules is marked with a corresponding position, boundary, and color;

a model calibration unit configured to match and calibrate a reconstructed three-dimensional model of the fracture part based on the fracture area of the patient in an actual surgical scene;

a path planning unit configured to input a matched and calibrated three-dimensional model of the fracture part and a corresponding fracture type and fracture surgery requirement into a fracture reduction path planning model to determine at least one corresponding optimized fracture reduction path; and a path confirmation unit configured to render each of the at least one optimized fracture reduction path, and determine a target fracture reduction path according to a detected interactive instruction.

* * * * *